United States Patent Office 3,775,476
Patented Nov. 27, 1973

3,775,476
AROMATIC ACID CHLORIDE PROCESS
Christian S. Rondestvedt, Jr., Wilmington, Del., assignor to E. I. du Pont de Nemours and Company, Wilmington, Del.
No Drawing. Continuation of application Ser. No. 875,542, Nov. 10, 1969. This application Nov. 15, 1972, Ser. No. 306,749
Int. Cl. C07c 51/58, 63/02, 63/22
U.S. Cl. 260—544 M                                    13 Claims

ABSTRACT OF THE DISCLOSURE

Process for preparing aromatic acid chlorides such as isophthaloyl chloride and terephthaloyl chloride, useful as intermediates for making polyester, polyamide and the like condensation polymers, which includes contacting an aromatic compound containing at least one trichloromethyl group bonded to an aromatic carbon atom with sulfur dioxide in the presence of antimony pentachloride or aluminum chloride as catalyst at a temperature and pressure and for a time sufficient to convert at least one trichloromethyl group to an acid chloride group.

CROSS REFERENCE TO RELATED APPLICATION

This is a continuation of application Ser. No. 875,542, filed Nov. 10, 1969.

The subject invention relates to a process for converting trichloromethyl-substituted aromatic compounds to aromatic acid chlorides by reaction with sulfur dioxide in the presence of antimony pentachloride or aluminum chloride as catalyst.

BACKGROUND

Aromatic acid chlorides are valuable intermediates, particularly poly-acid chlorides, such as isophthaloyl chloride and terephthaloyl chloride, useful for making polyester, polyamide and the like condensation polymers. Economically attractive intermediates to the acid chlorides are trichloromethyl-substituted aromatic compounds, obtainable by chlorinating methyl-substituted aromatic compounds by methods well known to the art. The methods proposed heretofore, however, for converting the trichloromethyl compounds to the acid chlorides are not entirely satisfactory.

U.S. Pat. No. 2,393,247 describes a method for making thionyl chloride by heating chloroform or carbon tetrachloride with sulfur dioxide in the presence of a Friedel-Crafts catalyst (polyvalent metal halide, e.g., AlCl$_3$) at 100 to 300° C. The disclosed reaction courses are:

(a) $CHCl_3 + SO_2 \rightarrow SOCl_2 + HCl + CO$ (b) $CCl_4 + 2SO_2 \rightarrow 2SOCl_2 + CO_2$ Reaction (b) also yielded phosgene, COCl$_2$, in small amounts, possibly by route (c):

(c) $CCl_4 + SO_2 \rightarrow SOCl_2 + COCl_2$

That COCl$_2$ is not the major product may perhaps be explained by the German Pat. No. 284,935 disclosure that COCl$_2$ and SO$_2$ react at 200° C. to yield SOCl$_2$ or SCl$_4$. Thus it appears that carbonyl chlorides in general are inherently unstable in the presence of SO$_2$ at elevated temperatures.

U.S. Pat. No. 3,411,886 discloses that ferric chloride catalyzes the reaction of sulfur dioxide with aromatic trichloromethyl compounds to produce thionyl chloride and aromatic acid chloride.

It has been found, however, that ferric chloride tends to promote tar formation at the expense of product purity and yield. Also, ferric chloride, which imparts a red color to the acid chloride and has a normal boiling point of 315° C., is difficult to remove from the organic product by distillation. The patent discloses precipitating the bulk of the iron compound with methylene chloride and extracting the residual iron by washing with water or ether. This is unsatisfactory since such additional treatment is costly and the wash solvents tend to react with the acid chloride. The patent also states that aluminum chloride is ineffective as a catalyst.

U.S. Pat. No. 2,856,425 describes converting aromatic trihalomethyl compounds to aromatic acid chlorides by heating (above 50° C. and preferably between 150° and 300° C.) with oxides of 4th and 5th group metals having atomic numbers in the 22 to 51 range, including specifically Ti, V, As, Zr and Sb.

The choice of oxide is apparently critical. The patent states that only the selected metal oxides give smooth reactions and pure products; that many other oxides react with trichloromethyl groups, but violently in many cases, with unwanted by-products resulting in major proportions.

BRIEF SUMMARY OF THE INVENTION

The subject process for preparing aromatic acid chlorides in general includes the steps of contacting an aromatic compound containing one or more trichloromethyl groups bonded to nonadjacent aromatic carbon atoms (usually a benzene with 1 to 2 trichloromethyl groups on nonadjacent ring positions and 0 to 3 other substituents taken from halo, alkyl, chloroalkyl, fluoroalkyl, alkoxy or carbonyl chloride, these other substituents preferably being at positions nonadjacent to the trichloromethyls) with sulfur dioxide in the presence of a catalytically effective amount of antimony pentachloride or aluminum chloride (normally 0.005 to 0.1 molecule per trichloromethyl group) at a temperature and pressure and for a time sufficient to convert at least one of the trichloromethyl (—CCl$_3$) groups to an acid chloride (—COCl) group; and recovering the resultant aromatic acid chloride.

A preferred embodiment is the preparation of isophthaloyl chloride or terephthaloyl chloride from 1,3- or 1,4-bis(trichloromethyl)benzene bearing 0 to 3 ring chloro groups or from m- or p-trichlorotoluyl chloride bearing 0 to 3 ring chloro groups.

DETAILED DESCRIPTION OF THE INVENTION

Basis for the invention

The invention is based on the discovery that antimony pentachloride and aluminum chloride are effective catalysts for the sulfur dioxide-aromatic trichloromethyl compound reaction over a wide range of temperatures, exerting such pronounced beneficial effects as lowering reaction temperatures and shortening reaction times while minimizing side reactions. Moreover the aromatic acid chloride product can be separated from the metal compounds by distillation, thus eliminatiny the need for costly solvent treatments of the reaction mass.

Thionyl chloride, the by-product in the process of this invention, is a well-known, widely useful industrial chemical. It is sufficiently volatile (more so than the metal halides and oxyhalides of the process of U.S. Pat. No. 2,856,425) to be readily and cleanly separated from the catalysts and aromatic acid chloride reaction product, and is likewise obtained in high yields.

The aromatic trichloromethyl component

The trichloromethyl (CCl$_3$) compounds that can be converted into acid chlorides in the invention process may vary widely so long as the corresponding aromatic carbonyl chlorides are capable of existence and are sufficiently stable under the defined thermal conditions to be recovered from the reaction mass. They may be broadly represented as (R)$_m$Ar(CCl$_3$)$_n$, where Ar stands for an aromatic nucleus, R is H or a substituent that does not interfere with the reaction or the products, $m$ and $n$ are integers of at least one each which together satisfy the valence of the aromatic nucleus, and the $CCl_3$ groups are on nonadjacent carbon atoms when $n$ is greater than one.

Thus the aromatic compounds may contain one or more trichloromethyl groups, normally one to three such groups per aromatic ring, and optionally may contain one or more other substituents inert to the acid chloride group under reaction conditions. Preferably the nuclear positions adjacent to at least one trichloromethyl will be free of substituents other than hydrogen. Included are compounds of the benzene, naphthalene, phenanthrene and anthracene series, also binuclear analogs thereof wherein two aryls, normally phenyls, with one or both carrying one or more trichloromethyl groups, are joined through an electron pair bond, an alkylene group such as methylene, ethylidene, propylidene or butylidene, a carbonyl group, or the like bridging group which is inert under the conditions of the reaction.

Non-interfering R substituents other than hydrogen that may be present along with the trichloromethyls in the compounds to be treated include: the halogens F, Cl, Br and I; alkyl, normally lower alkyl for reasons of availability, such as methyl, ethyl, isopropyl, tert-butyl; chloroalkyl other than trichloromethyl and normally lower chloroalkyl, such as chloromethyl, dichloromethyl and $\beta,\beta,\beta$-trichloroethyl; fluoroalkyl, such as fluoromethyl, difluoromethyl, trifluoromethyl, pentafluoroethyl, and perfluorobutyl; lower alkoxy such as methoxy, ethoxy, n-propoxyl, and n-butoxyl; and others such as carbonyl chloride, cyano and nitro.

The R substituents need not be completely unreactive. They need only be sufficiently inert to the carbonyl chloride compound produced in the reaction to allow its recovery. Thus there may be present carboxyl groups, which under the conditions of the reaction are converted to carbonyl chloride groups (COCl) by reaction with the thionyl chloride ($SOCl_2$) by-product. It should be noted that sulfur dioxide is known to oxidize aromatic side chain methyl groups to carboxylic groups at elevated temperatures. In the present process, however, the trichloromethyl group reacts preferentially with sulfur dioxide, particularly at the lower temperatures. Should side chain oxidation to carboxyl occur, the $SOCl_2$ by-product would convert it to COCl.

Surprisingly, electronegative substituents, such as Cl, COCl and additional $CCl_3$ groups, tend to promote the metal halide catalyzed reaction. It is possible however to stepwise convert poly(trichloromethyl) compounds to the poly-acid chlorides. For example with two trichloromethyls present, as in 1,3-bis(trichloromethylbenzene), reaction temperatures can be adjusted to stepwise yield the trichloromethyl-substituted benzoyl chloride. Such product can be recovered and the still unreacted trichloromethyl groups converted in a second separate reaction with sulfur dioxide or, if desired, in the same reactor by operating for longer times and/or at higher reaction temperatures. Similarly with three trichloromethyl groups present, as in 1,3,5-tris(trichloromethyl)benzene, the reaction can be controlled to yield one or more of bis(trichloromethyl)benzoyl chloride, trichloromethylisophthaloyl chloride and trimesoyl chloride.

Representative trichloromethyl compounds are:

benzotrichloride(trichloromethylbenzene),
o-chlorobenzotrichloride,
m-chlorobenzotrichloride,
p-chlorobenzotrichloride,
p-bromobenzotrichloride,
p-iodobenzotrichloride,
p-fluorobenzotrichloride,
3,4-dichlorobenzotrichloride,
m-methyl - benzotrichloride ($\alpha,\alpha,\alpha$ - trichloromethyl-m-xylene),
3,4-dimethylbenzotrichloride,
p-tert-butylbenzotrichloride,
p-trifluoromethylbenzotrichloride,
m-dichloromethylbenzotrichloride ($\alpha,\alpha,\alpha,\alpha',\alpha'$-pentachloro-m-xylene),
p-methoxybenzotrichloride,
m-ethoxybenzotrichloride,
p-n-butoxybenzotrichloride,
m-cyanobenzotrichloride,
p-nitrobenzotrichloride,
m-trichloromethylbenzoyl chloride ($\alpha,\alpha,\alpha$-trichloro-m-toluyl chloride),
p-trichloromethylbenzoyl chloride,
1,3-bis(trichloromethyl)benzene ($\alpha,\alpha,\alpha,\alpha',\alpha',\alpha'$-hexachloro-m-xylene),
5-chloro-1,3,-bis(trichloromethyl)benzene,
1,4-bis(trichloromethyl)benzene,
4-chloro-1,3-bis(trichloromethyl)benzene,
2,5-dichloro-1,4-bis(trichloromethyl)benzene,
2-chloro-1,3-bis(trichloromethyl)benzene,
2-chloro-1,4-bis(trichloromethyl)benzene,
4,5-dichloro-1,3-bis(trichloromethyl)benzene,
4,6-dichloro-1,3-bis(trichloromethyl)benzene,
2,5-dichloro-1,3-bis(trichloromethyl)benzene,
4,5,6-trichloro-1,3-bis(trichloromethyl)benzene,
1,3,5-tris(trichloromethyl)benzene ($\alpha,\alpha,\alpha,\alpha',\alpha',\alpha',\alpha'',\alpha'',\alpha''$-nonachloromesitylene),
1-trichloromethylnaphthalene,
1,5-bis(trichloromethyl)naphthalene,
2-trichloromethylphenanthrene,
1-trichloromethylanthracene,
p-trichloromethylbiphenyl,
p,p'-bis(trichloromethyl)biphenyl,
bis(p-trichloromethylphenyl)methane,
2,2-bis(p-trichloromethylphenyl)propane, and
p,p'-bis(trichloromethyl)benzophenone.

Trichloromethyl compounds of the benzene series, which may contain halo, alkyl, chloroalkyl, fluoroalkyl, alkoxyl and carbonyl chloride groups, represent an important reactant class, especially 1,3-bis(trichloromethyl)benzene and 1,4 - bis(trichloromethyl)benzene, since the corresponding acid chlorides enjoy wide utility. It will be noted that the hexachloro meta- and p-xylenes obtained by side chain chlorinating the parent aromatic hydrocarbons may contain ring chlorinated derivatives, as exemplified above. Such ring chlorinated trichloromethyl-containing materials may also be converted simultaneously to the corresponding ring chlorinated acid chlorides by the process of this invention.

The process—general

In the broad aspect of this process, an aromatic compound containing one or more trichloromethyl groups as described above is contacted with sulfur dioxide in the presence of a catalyst to effect the transformation of one or more trichloromethyls to carbonyl chloride groups. The reaction stoichiometry may be represented as (1) 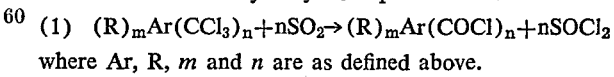

where Ar, R, $m$ and $n$ are as defined above.

Equation 1 requires one $SO_2$ molecule for each $CCl_3$ group to be converted. The actual quantity employed depends on the trichloromethyl compound, the operating temperatures and pressures and the degree of contact between the reactants during reaction.

The temperature, which should be sufficient to provide a liquid reaction mass and to effect the desired reaction, may vary widely. For example, it may be as low as 25° C. and normally need not be above 200° C.; preferably it is 60° to 170° C., most preferably 80° to 150° C.

$SO_2$ normally boils at $-10°$ C. so that for most effective contact with the trichloromethyl component over the entire operating temperature range the reaction is preferably conducted under agitation in closed vessels with at least one and usually not more than about 10 molecules of $SO_2$ per $CCl_3$ group, preferably 1.1 to 5. Larger $SO_2$ proportions may be used but are normally not necessary. The reactor loading is adjusted such that the sulfur dioxide pressure in the free space is sufficiently great to maintain sulfur dioxide in the phase occupied by the trichloromethyl compound. Normally the pressure is at least about 200 p.s.i.g. at reaction temperatures, preferably at least 500 p.s.i.g., the higher the better, with pressures greater than about 3500 p.s.i.g. seldom necessary. The means employed to agitate the reaction mass should be effective of course to disperse the sulfur dioxide in the reaction mass and provide intimate contact among the reactants.

The sulfur dioxide consumed during the reaction may be replenished by feeding additional $SO_2$ into the reactor, either into the reaction mass itself or into the free space normally present in closed systems. In one contemplated operating mode, the $SO_2$ is contiuously fed to the otherwise closed reactor during the reaction to maintain a substantially constant, high $SO_2$ partial pressure in the vapor space and thus provide a high proportion of $SO_2$ dissolved in the reaction mass liquid phase.

The catalyst

The metal chloride quantity may vary widely, for example from about 0.0005 to 0.1 molecule taken as antimony pentachloride ($SbCl_5$) or aluminum chloride ($AlCl_3$) per trichloromethyl group, preferably about 0.002 to 0.025 molecule per $CCl_3$ group. Antimony pentachloride is preferred because it is effective over a wide temperature range and promotes smooth reaction with little or no side (tar-forming) reaction. For example, on heating 1,3-bis(trichloromethyl)benzene with 2.1 to 3 molar proportions of $SO_2$ and 0.5 to 1.5 mole percent of antimony pentachloride at 80° to 100° C. in a closed reactor as described above, the conversion to isophthaloyl chloride is substantially complete in 1 to 4 hours. By way of contrast, to illustrate the catalyst's marked effect, the conversion in the absence of the catalyst is only a few percent after 24 hours at 80° to 120°. Further, to achieve substantially complete conversion in about 4 hours or less without catalyst requires a temperature of 230° C. or higher.

Reaction product recovery

When the reaction is substantially complete, the reaction mass is normally cooled, vented to recover unreacted sulfur dioxide and the mixture distilled to recover first thionyl chloride then the higher boiling acid chloride, which if necessary may be distilled at reduced pressures as disclosed in British Pat. No. 946,491 and U.S. Pat. No. 2,856,425. Where the acid chloride is normally solid or not distillable, it may be purified if desired by crystallization from melts or from solvent as is also well known to the art.

It has long been known that polyvalent metal chlorides form complexes with aromatic acyl chlorides. Antimony pentachloride, normal boiling point 140° C., forms relatively weak complexes and is readily stripped from the reaction mass and recovered for reuse as a forerun, at distillation pot temperatures of 100° C. or higher, during distillation recovery of the aromatic acid chloride products of the invention process. The aluminum chloride, on the other hand, evidently forms strong complexes and remains behind with the higher boilers during distillation recovery of the aromatic acid chloride.

Other invention features

One feature of this invention is that reaction solvents are normally not needed. They may be used, however, and in some cases afford substantial benefits by facilitating contact between the sulfur dioxide and the trichloromethyl compound. Useful diluents include thionyl chloride, phosphorus oxychloride, the aromatic acid chloride to be produced, and typical inert solvents such as chlorobenzene, ortho-dichlorobenzene and 1,2,4 - trichlorobenzene.

Still another feature of the invention is that moisture need not be excluded from the reaction system since thionyl chloride efficiently scavenges water, yielding sulfur dioxide and hydrogen chloride (not detrimental to the process). Thus thionyl chloride may be advantageously added to the initial reaction charge where water contamination of the reactants or reactor is suspected or has inadvertently occurred.

EXAMPLES

The following examples are intended to illustrate the invention and are not intended to be in limitation thereof. Other materials and conditions as described above may likewise be employed with advantageous results.

Unless otherwise stated, quantities are in parts by weight; temperatures in ° C.

Pressures, where not stated in the shaken bomb reactor runs described below, are always greater than 200 p.s.i.g.

Examples 1 to 8.—$SbCl_5$ catalyzed process

Benzotrichloride (or a substituted benzotrichloride as identified below) and antimony pentachloride (0.0013 mole/$CCl_3$ group) weer charged to a shaker bomb lined with Hastelloy C, a corrosion resistant nickel alloy, and equipped with means for sensing internal reaction mass temperautres and free space pressures. The bomb was evacuated, cooled somewhat and sulfur dioxide (3.3 moles/$CCl_3$ group) was added. The total reactor charge corresponded to a 350 grams/liter bomb loading density. The reactor was sealed, heated at 90° for 2 hours, cooled, vented to release unreacted $SO_2$ and distilled, first at atmospheric pressure to recover thionyl chloride, then under reduced pressure to recover the aromatic acid chloride product and any unreacted trichloromethyl compound. The distillate was analyzed by vapor phase chromatography. The yields of the corresponding benzoyl chlorides and of the recovered starting material, where noted, are given below.

| Example | R—$C_6H_4$—$CCl_3$, R= | ArCOCl, percent yield | ArCCl$_3$, percent recovered |
|---|---|---|---|
| 1 | H | 9 | 39 |
| 2 | o-F | 38 | 9 |
| 3 | m-F | 82 | 1 |
| 4 | p-F | 60 | 24 |
| 5 | o-Cl | 81 | 1 |
| 6 | m-Cl | 67 | 22 |
| 7 | p-Cl | 50 | 37 |
| 8 | m-COCl | 96 | 2 |

Without the catalyst, the conversions are much lower under otherwise similar conditions, and much higher temperatures or longer times are required to obtain comparable results.

The distilled products of the above examples were orange-colored owing to the presence of antimony pentachloride which co-distilled during the simple distillation recovery. The antimony contaminant is readily removed as a low-boiling fraction by topping or by fractionally distilling at pot temperatures of 100° and above.

Examples 9–13.—$SbCl_5$ catalyzed conversions of 1,3-bis(trichloromethyl)benzene to isophthaloyl chloride 1,3-bis(trichloromethyl)benzene (designated HCMX), sulfur dioxide ($SO_2$) and antimony pentachloride ($SbCl_5$), in amounts tabulated below, were heated together in a sealed reactor, as described in Examples 1–8. After the reaction times at the various temperatures tabulated below, unreacted $SO_2$ was removed by venting the reactor, the reaction mass was distilled, first at atmospheric pressure at pot temperatures up to 210° C. to recover thionyl chloride, then at reduced pressures in a simple distillation to recover isophthaloyl chloride (B.P. 145°/15 mm.; 180°/30 mm.). Conversion of the bis-trichloromethyl compound to isophthaloyl chloride was found to be substantially complete; the yields are 95% or better with little or no tar formation.

| Example | Molar SO$_2$/HCMX ratio | Molar SbCl$_5$/HCMX ratio | Temp., °C. | Time, hours |
|---|---|---|---|---|
| 9 | 2.3 | .003 | 30 | 25 |
| 10 | 3.0 | .003 | 100 | 3 |
| 11 | 7.5 | .0078 | 100 | 1.5 |
| 12 | 7.5 | .020 | 120 | 2 |
| 13 | 7.5 | .039 | 170 | 3 |

In contrast, without the SbCl$_5$ present in otherwise comparable systems, the conversion to isophthaloyl chloride was 4.25% after 20 hours at 110°. Further, to completely convert to isophthaloyl chloride in only 3 hours reaction time required a temperature of about 230°, while about 14 hours heating was required at 170°, in the uncatalyzed system.

It should be noted that the reaction times shown for the catalyzed reaction are not necessarily the minimum for achieving complete conversion to acid chloride, but the results do show the remarkable effect of the catalyst in lowering temperatures and shortening the reaction times.

The isophthaloyl produced in the above examples can be freed of any residual catalyst that may have distilled with it during the distillation recovery and obtained substantially colorless and pure by redistillation in a 1" x 22" heated corrosion resistant packed column. The catalyst concentrates in a small foreshot.

In contrast, when the above reaction is repeated with 2.5 mole percent FeCl$_3$ at 120° for 2 hours or with 3.7 mole percent FeCl$_3$ at 140° for 2 hours the isophthaloyl chloride yields are 86 and 87%, respectively, with the remainder tar, i.e., unidentified products higher boiling than the starting 1,3-bis(trichloromethyl)benzene. Furthermore the red color (due to iron) of the isophthaloyl chloride could not be removed by distillation.

Example 14

4 - chloro - 1,3 - bis(trichloromethyl)benzene (0.345 mole), SO$_2$ (1.5 mole) and SbCl$_5$ (0.0015 mole) were mixed and heated in the shaker reactor described in Examples 1–8 for 4 hours at 90°. The reaction mass was cooled, vented and distilled under reduced pressure to yield a mixture containing 4-chloro-isophthaloyl chloride (21%), 2-chloro-5-trichloromethylbenzoyl chloride (3%), 4 - chloro - 3 - trichloromethylbenzoyl chloride (75%) and unreacted 4-chloro-1,3-bis(trichloromethyl)benzene (1%).

The conversion to 4-chloro-isophthaloyl chloride is increased substantially on heating for longer times. For example, it is 77% after 8 hours at 90°.

Example 15

The procedure of Examples 9 to 13 was repeated without SbCl$_5$, employing 2-chloro-1,3-bis(trichloromethyl)benzene (0.2 mole) and sulfur dioxide (1.5 moles) and heating at 225° for 6 hours. Distillation of the reaction mixture under reduced pressure yielded a mixture containing 2-chloroisophthaloyl chloride (57%), 2-chloro-3-trichloromethylbenzoyl chloride (40%) and 2 - chloro-1,3-bis(trichloromethyl)benzene (about 2%), which was then heated with 7.5 molar proportions of SO$_2$ and 0.075 molar proportion of SbCl$_5$ for 4 hours at 90° in the sealed reactor of Examples 1–8. Conversion of the remaining CCl$_3$ to COCl groups is substantially complete and 2-chloro-isophthaloyl chloride is obtained in 90% yield on distillation under reduced pressures.

Example 16.—Atmospheric pressure reaction 1,3 - bis(trichloromethyl)benzene containing 0.0315 molar proportion of SbSl$_5$ was held at 95±5° C. while SO$_2$ gas in excess was sparged through the molten mass continually and at a rate sufficient for good mixing. After 9½ hours the mixture contained 2.1% isophthaloyl chloride, 46.6% α,α,α-trichloro-m-toluyl chloride and 57.3% 1,3-bis(trichloromethyl)benzene.

Examples 17 to 20.—Aluminum chloride catalysis

The procedure of Examples 9 to 13 was repeated with 1,3-bis(trichloromethyl)benzene (0.2 mole), sulfur dioxide (1.5 moles) and aluminum chloride (3.75 or 5.0 mole percent based on the aromatic compound) under conditions noted below. Results are expressed below as percent yield of isophthaloyl chloride (ICl), α,α,α-trichloro-m-toluyl chloride (TCTC), where obtained, and recovered 1,3-bis(trichloromethyl)benzene (HCMX).

| Example | AlCl$_3$, mole percent | Temp., °C. | Time, hours | Results |
|---|---|---|---|---|
| 17 | 3.75 | 65 | 2 | 3.6% ICl, 26% TCTC, 24% HCMX. |
| 18 | 3.75 | 120 | 2 | 53% ICl, 34% TCTC, 1.3% HCMX. |
| 19 | 5.0 | 110 | 10 | 88% ICl. |
| 20 | 5.0 | 140 | 2 | 87% ICl. |

Example 21.—Terephthaloyl chloride preparation

The procedure of Examples 9 to 13 was repeated with 1,4-bis(trichloromethyl)benzene, 7.5 molar proportions of SO$_2$ and 0.0195 molar proportion of SbCl$_5$. The mixture was heated at 90° for 2 hours and worked up as above by distillation under reduced pressure. Terephthaloyl chloride (B.P. 111°/20 mm. Hg) was obtained in 92% yield along with a 7% yield of α,α,α-trichloro-p-toluyl chloride and substantially no tar.

In comparison, with ferric chloride as the catalyst under these conditions terephthaloyl chloride is obtained in about 88% yield accompanied by less than 1% of α,α,α-trichloro-p-toluyl chloride, the rest being tar.

As seen from the foregoing description and examples, the subject invention provides a novel, economically attractive process for converting aromatic CCl$_3$ groups to COCl groups which avoids many of the disadvantages of prior methods.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing aromatic acid chlorides which comprises contacting an aromatic compound having one or more trichloromethyl groups bonded to nonadjacent aromatic carbon atoms with sulfur dioxide in the presence of a catalytically effective amount of antimony pentachloride at a temperature from as low as 25° to about 200° C. and at a pressure and for a time sufficient to convert at least one trichloromethyl group to an acid chloride group; and recovering an aromatic acid chloride by distillation.

2. Claim 1 wherein
   (a) said aromatic compound is a benzene bearing 1 to 2 trichloromethyl groups on nonadjacent ring positions and 0 to 3 other substituents selected from halo, alkyl, chloroalkyl, fluoroalkyl, alkoxyl and carbonyl chloride;
   (b) the sulfur dioxide is present in an amount of 1 to about 10 molecules per trichloromethyl group; and
   (c) the pressure is at least about 200 p.s.i.g.

3. Claim 2 wherein about 0.0005–0.1 molecule of said antimony pentachloride is present per trichloromethyl group.

4. Claim 3 wherein all ring positions adjacent to at least one trichloromethyl group are unsubstituted.

5. Claim 3 wherein said aromatic compound is selected from 1,3-bis(trichloromethyl)benzene bearing 0 to 3 ring chloro groups, 1,4-bis(trichloromethyl)benzene bearing 0 to 3 ring chloro groups, m-trichlorotoluyl chloride bearing 0 to 3 ring chloro groups and p-trichlorotoluyl chloride bearing 0 to 3 ring chloro groups.

6. Claim 5 wherein the sulfur dioxide is present in an amount of 1.1 to 5 molecules per trichloromethyl group and the reaction temperature is 60°–170° C.

7. The process which comprises heating a benzene compound selected from 1,3- or 1,4-bis(trichloromethyl)-benzene bearing 0 to 3 ring chloro groups and m- or p-trichlorotoluyl chloride bearing 0 to 3 ring chloro groups with 1 to 3 molecules of sulfur dioxide per trichloromethyl group in the presence of 0.002 to 0.025 molecules of antimony pentachloride per trichloromethyl group at 80°–150° C. and a pressure of at least 200 p.s.i.g. for a time sufficient to convert the trichloromethyl groups to acid chloride groups; and recovering thionyl chloride and the correspondinng iso- or terephthaloyl chloride by distillation.

8. Process for preparing aromatic acid chlorides which comprises contacting an aromatic compound having one or more trichloromethyl groups bonded to nonadjacent aromatic carbon atoms with sulfur dioxide in the presence of a catalytically effective amount of antimony pentachloride at a temperature from as low as 25° to about 200° C. and at a pressure and for a time sufficient to convert at least one trichloromethyl group to an acid chloride group; and recovering an aromatic acid chloride.

9. Claim 8 wherein (a) said aromatic compound is a benzene bearing 1 to 2 trichloromethyl groups on nonadjacent ring positions and 0 to 3 other substituents selected from halo, alkyl, chloroalkyl, fluoroalkyl, alkoxy and carbonyl chloride;
(b) the sulfur dioxide is present in an amount of 1 to about 10 molecules per trichloromethyl group; and
(c) the pressure is at least about 200 p.s.i.g.

10. Claim 9 wherein about 0.005–0.1 molecule of said antimony pentachloride is present per trichloromethyl group.

11. Claim 10 wherein all ring positions adjacent to at least one trichloromethyl group are unsubstituted.

12. Claim 10 wherein said aromatic compound is selected from 1,3-bis(trichloromethyl)benzene bearing 0 to 3 ring chloro groups, 1,4-bis(trichloromethyl)benzene bearing 0 to 3 ring chloro groups, m-trichlorotoluyl chloride bearing 0 to 3 ring chloro groups and p-trichlorotoluyl chloride bearing 0 to 3 ring chloro groups.

13. Claim 12 wherein the sulfur dioxide is present in an amount of 1.1 to 5 molecules per trichloromethyl group and the reaction temperature is 60°–170° C.

References Cited
UNITED STATES PATENTS 3,411,886  11/1968  Burk _____ 260—544 M JAMES A. PATTEN, Primary Examiner R. D. KELLY, Assistant Examiner

PO-1050
(5/69)

UNITED STATES PATENT OFFICE
CERTIFICATE OF CORRECTION

Patent No. 3,775,476     Dated Nov. 27, 1973

Inventor(s) Christian S. Rondestvedt, Jr.

It is certified that error appears in the above-identified patent and that said Letters Patent are hereby corrected as shown below:

Col. 10, Claim 10, line 9, "0.005-" should be
-- 0.0005- --

Signed and sealed this 23rd day of April 1974.

(SEAL)
Attest:

EDWARD M. FLETCHER, JR.
Attesting Officer

C. MARSHALL DANN
Commissioner of Patents